(12) United States Patent
Reja et al.

(10) Patent No.: US 10,848,196 B2
(45) Date of Patent: Nov. 24, 2020

(54) RADIO FREQUENCY INPUT/OUTPUT FOR RADIO TRANSCEIVERS

(71) Applicant: Dialog Semiconductor B.V., s-Hertogenbosch (NL)

(72) Inventors: Mahbub Reja, Chandler, AZ (US); Shobak Kythakyapuzha, Tempe, AZ (US); Zhi Mou, Gilbert, AZ (US); Mohammad Hanif, Chandler, AZ (US)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 15/843,440

(22) Filed: Dec. 15, 2017

(65) Prior Publication Data
US 2019/0190560 A1    Jun. 20, 2019

(51) Int. Cl.
   *H04B 1/38*     (2015.01)
   *H04B 1/40*     (2015.01)
   *H01F 27/29*    (2006.01)
   *H04B 1/525*    (2015.01)

(52) U.S. Cl.
   CPC ............. *H04B 1/40* (2013.01); *H01F 27/29* (2013.01); *H04B 1/525* (2013.01)

(58) Field of Classification Search
   CPC .................................. H04B 1/40; H01F 27/29
   See application file for complete search history.

(56) References Cited

U.S. PATENT DOCUMENTS

| | | | |
|---|---|---|---|
| 5,892,425 | A | 4/1999 | Kuhn et al. |
| 8,169,050 | B2 | 5/2012 | Daley et al. |
| 2015/0035625 | A1* | 2/2015 | Ohtomo ............... H01L 23/5227 333/213 |
| 2016/0036136 | A1* | 2/2016 | Lin ....................... H01Q 21/245 455/73 |
| 2018/0040413 | A1* | 2/2018 | Yen ..................... H01F 27/2804 |

FOREIGN PATENT DOCUMENTS

WO     WO 2016/005537     1/2016

OTHER PUBLICATIONS

"A Bluetooth Low-Energy Transceiver With 3.7-mW All-Digital Transmitter, 2.75-mW High-IF Discrete-Time Receiver, and TX/RX Switchable On-Chip Matching Network," by Feng-Wei Kuo et al., IEEE Journal of Solid-State Circuits, vol. 52, No. 4, Apr. 2017, pp. 114-1162.

* cited by examiner

*Primary Examiner* — Xin Jia
(74) *Attorney, Agent, or Firm* — Saile Ackerman LLC; Stephen B. Ackerman

(57) ABSTRACT

A radio frequency input/output circuit with a composite inductor structure is presented. The composite inductor structure has a plurality of inductors that are interwound. The composite inductor structure is implemented on a chip. The plurality of inductors are magnetically coupled. The plurality of inductors are interwound around a core. A second inductor is coupled in series with a first inductor and the first inductor is coupled in series with the third inductor. The first inductor and the third inductor are coupled at a centre tap, such that the first inductor and the third inductor form a centre-tapped coil. The centre tap is coupled to an input terminal.

17 Claims, 20 Drawing Sheets

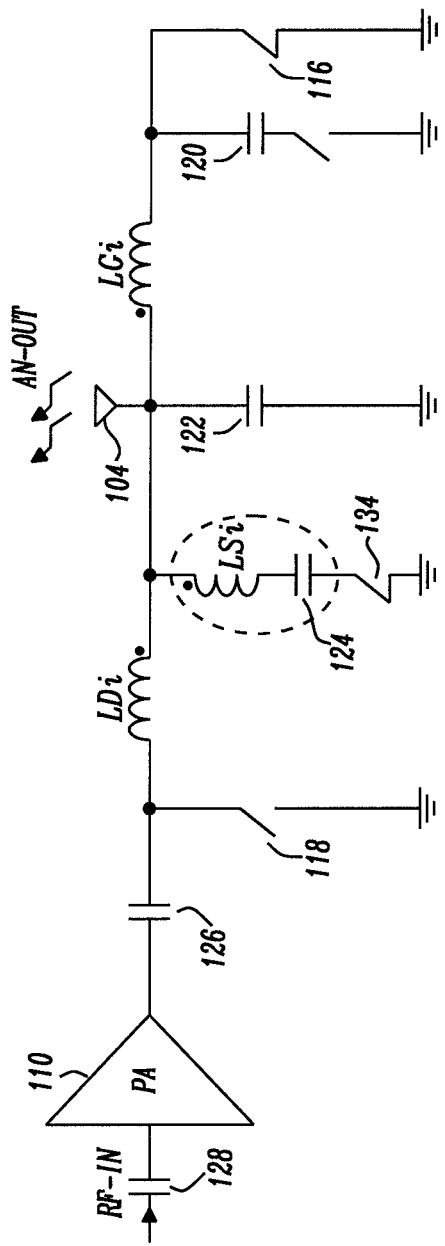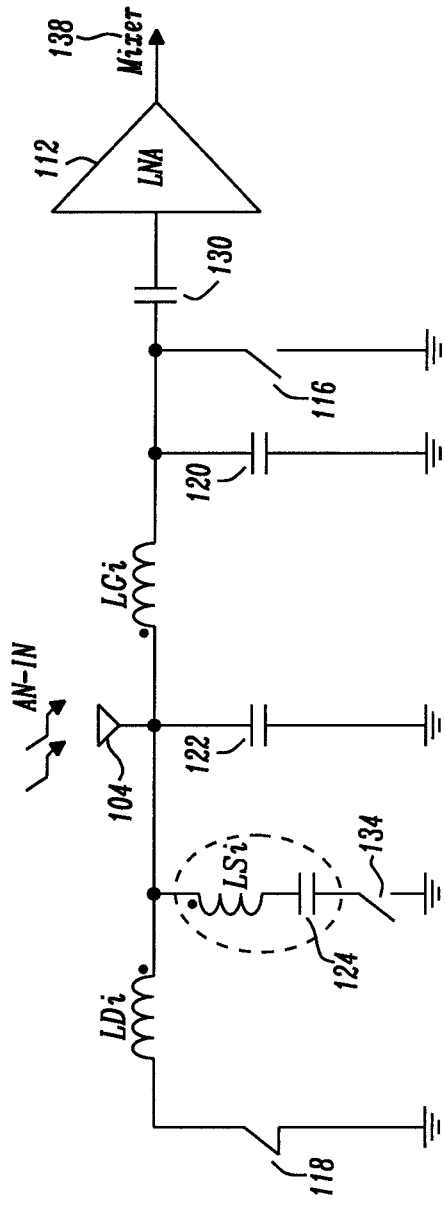
FIG. 3a Prior Art
FIG. 3b Prior Art

RADIO FREQUENCY INPUT/OUTPUT FOR RADIO TRANSCEIVERS

TECHNICAL FIELD

The present disclosure relates to apparatus and methods for a radio frequency input/output (RFIO) circuit for radio transceivers.

BACKGROUND

Radio frequency input/outputs (RFIOs) are used in low-power radio transceivers (for example Bluetooth Low Energy (BLE) and Zigbee radios) and typically use multiple and separate on-chip inductors that collectively occupy a large chip area. RFIOs typically use three or four individual inductors (coils) or inductor-transformer combinations to achieve low noise-amplifier (LNA) input matching, power-amplifier (PA) output matching and filtering (removing or attenuating higher-order harmonics). The LNA and PA may be referred to as core RF circuits. The RFIO, specifically a transmit/receive (Tx/Rx) switch, connects a receiver (Rx) input or a transmitter (Tx) output to the antenna.

FIG. 1(a) shows a schematic of an RFIO 100 for a BLE radio, where the RFIO comprises three isolated inductors (LDi, LGi and LSi) 102. FIG. 1(b) shows an on-chip implementation of the isolated inductors 102. Implementation of the isolated inductors requires a large area of a chip. This can correspond to almost two thirds of the area of a whole radio chip. Moreover, the isolated inductors 102 are bulky, and their widespread distribution over a large area on the chip increases losses (both magnetic and electrical losses), which degrades the performance of the core RF circuits: PA and LNA. Degradation may be observed in gain, noise figure, power, stability and linearity.

The large area over which the isolated inductors are distributed causes increased magnetic and electrical (capacitive) losses. The electrical (capacitive) losses are due to large coupling to the substrate. This results in degraded quality factor or Q factors (a decreased efficiency) of the isolated inductors which leads to degradation of the performance of the core RF circuits. There is also a large magnetic coupling to nearby circuits and systems which affects the nearby circuits and systems, and also affects the performance of the core RF circuits (PA and LNA). Moreover, long interconnects between the isolated inductors causes additional losses. Importantly, a large chip area causes increased cost for low-power radio transceivers.

FIG. 2 shows an on-chip implementation of an alternative to the isolated inductors of FIG. 1. In the alternative structure, a small inductor 150 is embedded within the core of a large inductor 152. The small inductor 150 and the large inductor 152 are physically separated. The Q factor of the large inductor 152 is reduced because of additional losses caused by currents induced in the small inductor 150. As the small inductor 150 is embedded within the core of the large inductor 152, the small inductor has a comparatively small core such that the small inductor has a low Q factor. The low Q factors leads to degradation of the performance of the core RF circuits. Additionally, close proximity of the inductors 150, 152 may reduce the inductances of each of the inductors 150, 152, if the currents in the inductors 150, 152 are in opposite directions.

It is possible to compensate for the above issues concerning the low Q factors and low inductances of the small inductor 150 and the large inductor 152 by increasing the area occupied by the inductors. However, this is impractical for an on-chip implementation, as the larger area would lead to electrical (capacitive) losses due to large coupling to the substrate, which would degrade the Q factors. Also, the addition of further inductors to increase the functionality of the alternative structure would require a larger area which would further degrade the Q factors.

SUMMARY

It is desirable to provide an improved RFIO which can be implemented using less surface area of a chip.

According to an aspect of the present invention there is provided a radio frequency input/output circuit comprising a composite inductor structure, the composite inductor structure comprising a plurality of inductors that are interwound.

Optionally, the composite inductor structure is implemented on a chip.

Optionally, the plurality of inductors are magnetically coupled.

Optionally, the plurality of inductors are interwound around a core.

Optionally, the composite inductor structure comprises a first inductor, a second inductor and a third inductor.

Optionally, the second inductor is coupled in series with the first inductor and the first inductor is coupled in series with the third inductor.

Optionally, the first inductor and the third inductor are coupled at a centre tap, such that the first inductor and the third inductor form a centre-tapped coil.

Optionally, the centre tap is coupled to an input terminal.

Optionally, the first inductor and the second inductor are coupled to an antenna.

Optionally, the radio frequency input/output circuit is operable in a transmit mode in which an input signal received at the input terminal is routed to the antenna to be transmitted by the antenna as an antenna output signal.

Optionally, the input terminal is coupled to a power amplifier and the input terminal receives the input signal from the power amplifier.

Optionally, the power amplifier is an inverter based Class D amplifier.

Optionally, the second inductor is coupled to an output terminal.

Optionally, the radio frequency input/output circuit is operable in a receive mode in which an antenna input signal received at the antenna is routed to the output terminal.

Optionally, the output terminal is coupled to a low noise amplifier and the low noise amplifier receives an output signal from the output terminal.

Optionally, the low noise amplifier is an inverter amplifier.

Optionally, the third inductor is coupled to a harmonic capacitor.

Optionally, the composite inductor structure comprises an additional inductor.

Optionally, the additional inductor is coupled to the centre tap.

Optionally, the additional inductor is coupled to the input terminal.

Optionally, the composite inductor structure is implemented on the top surface of the chip.

Optionally, the composite inductor structure is embedded within the chip.

Optionally, one or more of the inductors of the composite inductor structure are at different depths of the chip.

Optionally, one or more of the inductors of the composite inductor structure span different depths of the chip.

Optionally, the radio frequency input/output circuit comprises a first series LC resonator comprising the first inductor and a first capacitor coupled in series, in the transmit mode.

Optionally, the radio frequency input/output circuit comprises a second series LC resonator comprising the third inductor and the harmonic capacitor coupled in series, in the transmit mode.

Optionally, the radio frequency input/output circuit comprises a first parallel LC resonator comprising the second inductor and a transmission capacitor coupled in parallel, in the transmit mode.

Optionally, the radio frequency input/output circuit comprises a second parallel LC resonator comprising the first inductor and the transmission capacitor, in the receive mode.

BRIEF DESCRIPTION OF THE DRAWINGS

The disclosure is described in further detail below by way of example and with reference to the accompanying drawings, in which:

FIGS. 3a and 3b are a schematic diagram of the operating portion of the RFIO of FIG. 1 in (a) a transmit (Tx) mode and (b) a receive (Rx) mode, in accordance with the prior art;

DESCRIPTION

This disclosure relates to a radio frequency input/output (RFIO) circuit, or RFIO for short. An RFIO provides an interface between an antenna and an input and/or output of a system. An RFIO preferably incorporates an input-output matching function and a filtering function. The RFIO of the present disclosure is designed for, but not limited to, low cost (low-die area) and low power CMOS radios. For example, the RFIO may be used in low cost radios for Bluetooth standards (such as 802.15.1 and others), Zigbee and WLAN standards.

Figure 1A:
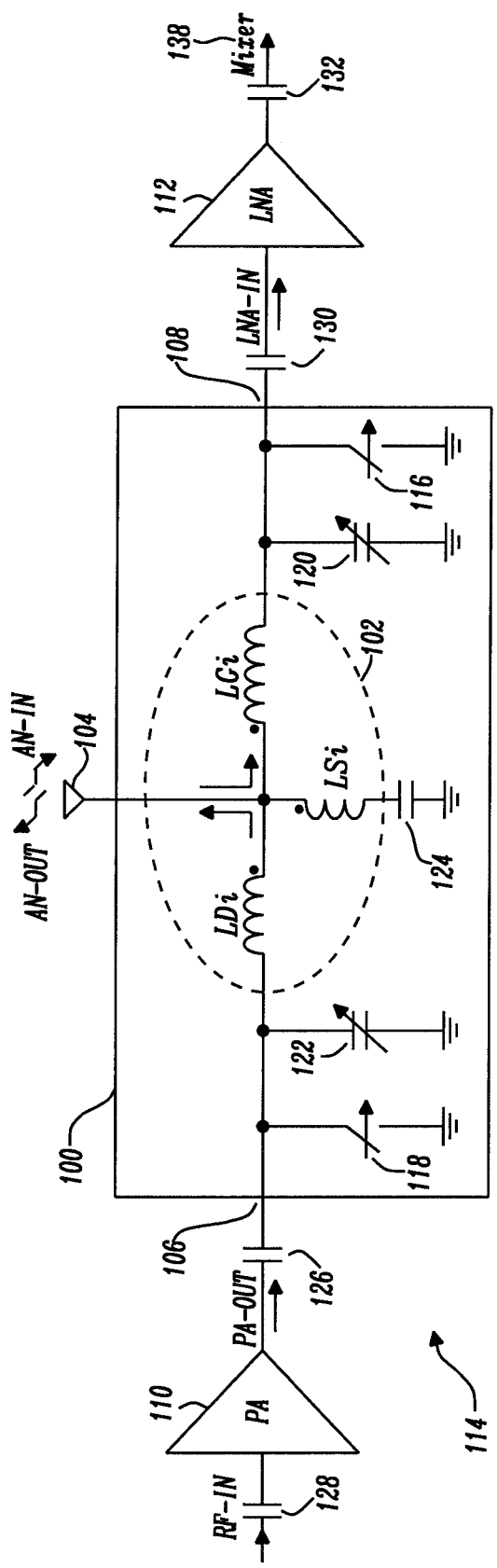
FIGS. 1a and 1b are a (a) schematic diagram and (b) an on-chip implementation of a radio frequency input/output (RFIO) in accordance with the prior art.

FIG. 1(a) shows a schematic of a radio frequency input/output (RFIO) 100 for a Bluetooth Low Energy (BLE) radio. A radio front end 114 comprises the RFIO 100, a power amplifier (PA) 110, a low-noise amplifier (LNA) 112 and an antenna 104.

Figure 1B:
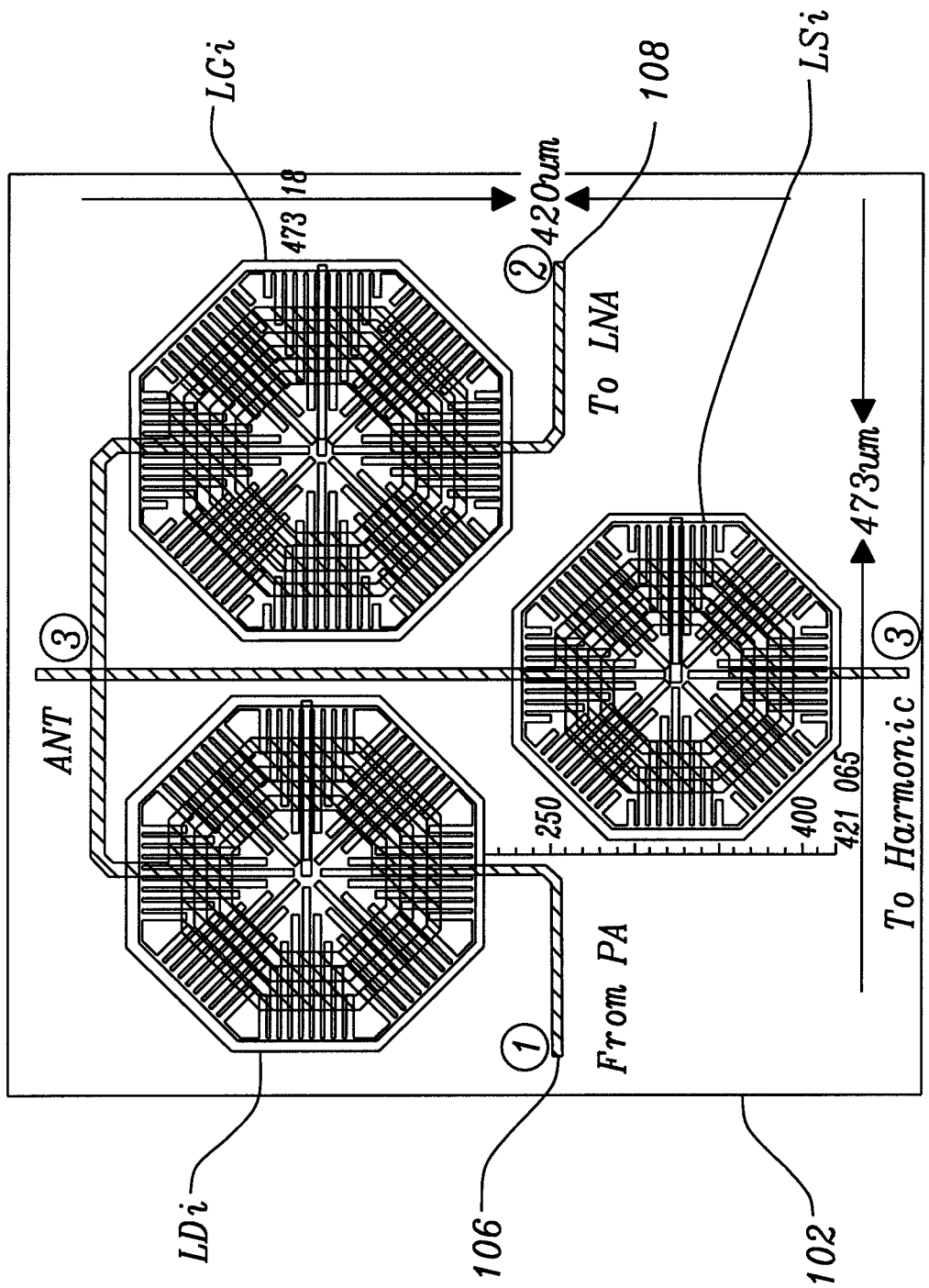
Figure 2:
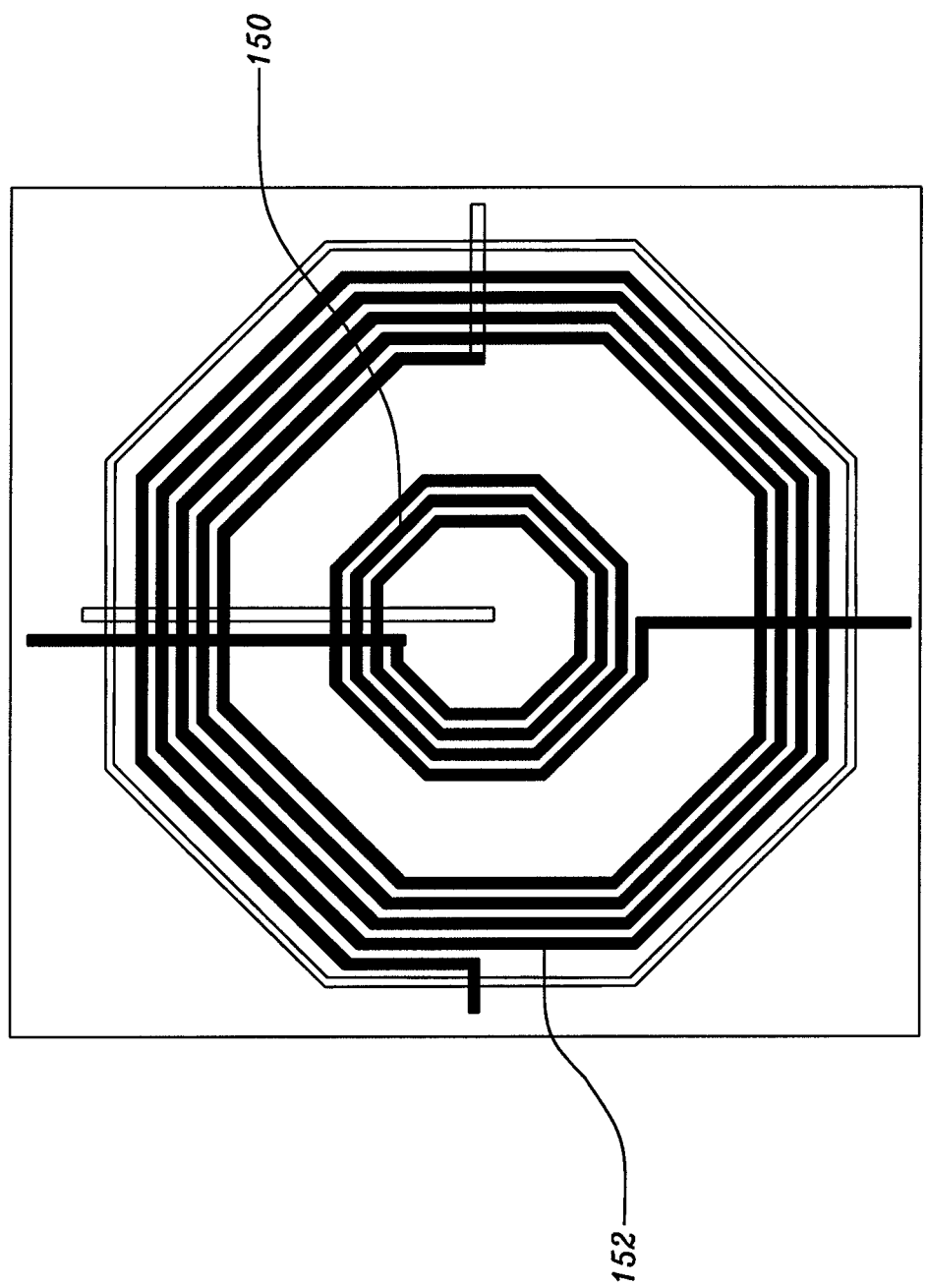
FIG. 2 is a plan view of an on-chip implementation of a small inductor embedded within the core of a large inductor in accordance with the prior art.

The RFIO 100 comprises three isolated inductors 102, a first MOSFET switch 116, a second MOSFET switch 118, a receive (Rx) capacitor 120, a transmit (Tx) capacitor 122 and a harmonic capacitor 124. The Rx and Tx capacitors 120, 122 may be tuning or trimming capacitors. The isolated inductors 102 comprise a first isolated inductor LDi, a second isolated inductor LGi, and a third isolated inductor LSi. FIG. 1(b) shows a schematic of an on-chip implementation of the isolated inductors 102.

The first isolated inductor LDi has a first terminal coupled to a first terminal of the second MOSFET switch 118 and a first terminal of the Tx capacitor 122. A second terminal of the second MOSFET switch 118 and a second terminal of the Tx capacitor 122 are coupled to ground.

The first isolated inductor LDi has a second terminal coupled to a first terminal of the second isolated inductor LGi, a first terminal of the third isolated inductor LSi and the antenna 104.

A second terminal of the third isolated inductor LSi is coupled to a first terminal of the harmonic capacitor 124, which has a second terminal coupled to ground.

The second isolated inductor LGi has a second terminal coupled to a first terminal of the first MOSFET switch 116 and a first terminal of the Rx capacitor 120. A second terminal of the first MOSFET switch 116 and a second terminal of the Rx capacitor 120 are coupled to ground.

An input terminal 106 of the RFIO 100 is coupled to an output of the PA 110 via a first capacitor 126. In a transmit (Tx) mode the PA 110 receives an RF input signal RF-IN via a second capacitor 128 and outputs a PA output signal PA-OUT that is received at the input terminal 106 via the first capacitor 126. The input terminal 106 is coupled to the first terminal of the first isolated inductor LDi.

An output terminal 108 of the RFIO 100 is coupled to an input of the LNA 112 via a third capacitor 130. In a receive (Rx) mode the LNA 112 receives a LNA input signal LNA-IN from the output terminal 108 via the third capacitor 130. The LNA 112 is coupled to a mixer 138 via a fourth capacitor 132. The output terminal 108 is coupled to the second terminal of the second isolated inductor LGi.

FIG. 3(a) shows a functional equivalent circuit of the RFIO 100 of FIG. 1 in the Tx mode comprising PA output matching and filtering. FIG. 3(b) shows a functional equivalent circuit of the RFIO of FIG. 1 in the Rx mode comprising LNA input matching.

In FIGS. 3(a) and 3(b) the RFIO 100 of FIG. 1 further comprises a harmonic switch 134, that is coupled between the harmonic capacitor 124 and ground.

Figure 4:
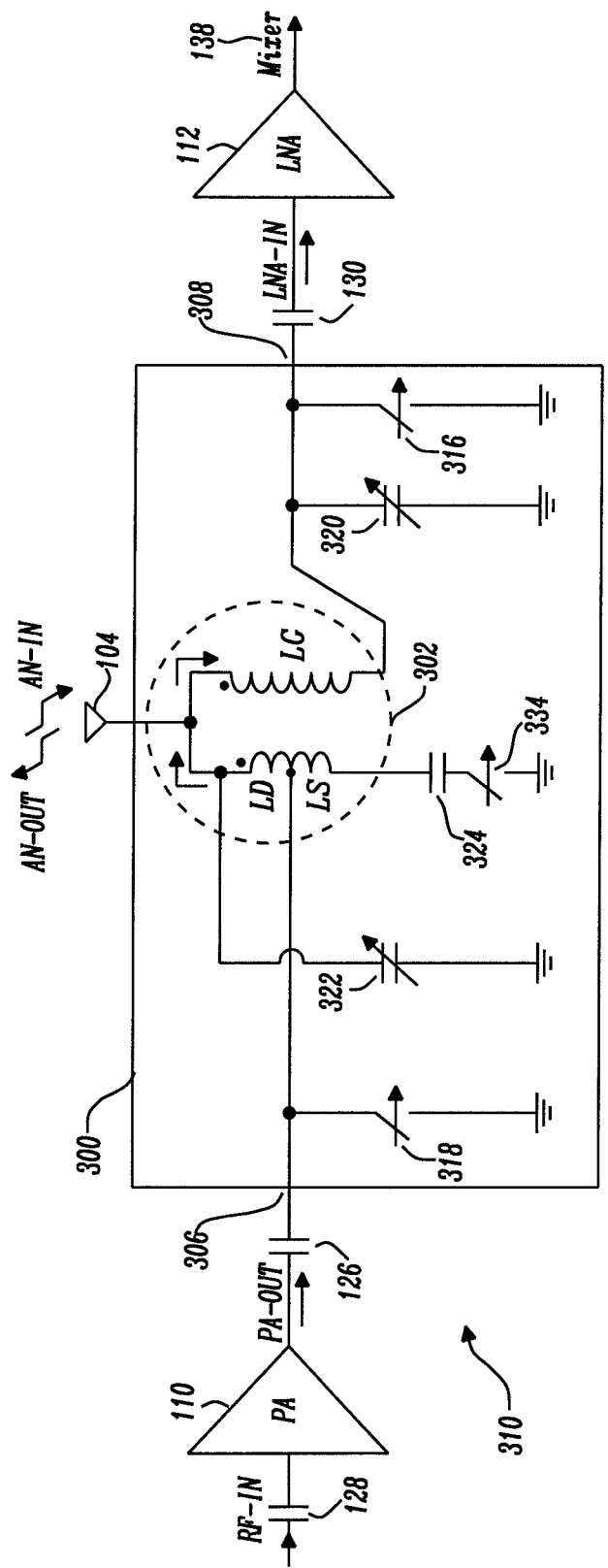
FIG. 4 is a schematic diagram of an RFIO in accordance with a first embodiment of this disclosure.

FIG. 4 shows a radio frequency input/output (RFIO) 300 for a radio transceiver in accordance with a first embodiment of this disclosure. The RFIO 300 may, for example, be implemented in a BLE or Zigbee radio. The RFIO 300 is implemented in a radio front-end 310. The radio front-end 310 shares some common features with the radio front end 114 of FIG. 1, as represented by common reference numerals. The radio front-end 310 comprises the RFIO 300, a power amplifier (PA) 110, a low-noise amplifier (LNA) 112 and an antenna 104. It will be appreciated that the RFIO 300 may be implemented in other ways and is not limited to the radio front-end 310 implementation shown in FIG. 4.

The RFIO 300 comprises a composite inductor structure 302, a Tx switch 316, a Rx switch 318, a harmonic switch 334, a Rx capacitor 320, a Tx capacitor 322 and a harmonic capacitor 324. The switches 316, 318, 334 may be MOSFETs. The Rx and Tx capacitors 320, 322 may be tuning or trimming capacitors which may be digitally controlled.

The present disclosure eliminates the requirement for separate isolated inductors by implementing the required inductors in a single component composite-structure coil, referred to as a composite inductor structure 302. The composite inductor structure 302 can occupy a very small chip area and can lead to an ultra-compact RFIO for low power BLE radios.

The composite inductor structure 302 comprises a first inductor LD, a second inductor LG and a third inductor LS. The first, second and third inductors LD, LG, LS are magnetically coupled together and are interwound to form the composite inductor structure 302.

By "interwound" it is meant that each of the inductors are wound around each other. In other words, the inductors are at least to some extent intertwined, braided, or otherwise wrapped around each other. The inductors also are wound around the same point or axis and they enclose a common central area. The inductors therefore essentially occupy the same lateral area or footprint on the chip. This is in contrast with the isolated inductors as described previously, where each isolated inductor is wound around a different point or axis, each isolated inductor encloses a different central area, and the inductors are not wound around each other. The central area may comprise a core. The central area may be referred to as a hollow area if no core is present. The term "composite" is in reference to the composite inductor structure 302 being a single structure that is formed from multiple inductors, possibly using a single core. The term "magnetic coupling" of the three inductors LD, LG, LS is in reference to magnetic coupling between the inductors. The three inductors LD, LG, LS may also be referred to as being "magnetically coupled", in reference to magnetic coupling between the inductors.

Each isolated inductor of the prior art of FIG. 1(b) is formed around its own core and requires a relatively large chip area. In this disclosure, a single core may be shared among two or more of the three inductors LD, LG, LS. Additionally, one or more cores may be shared between one or more of the three inductors LD, LG, LS.

Figure 5:
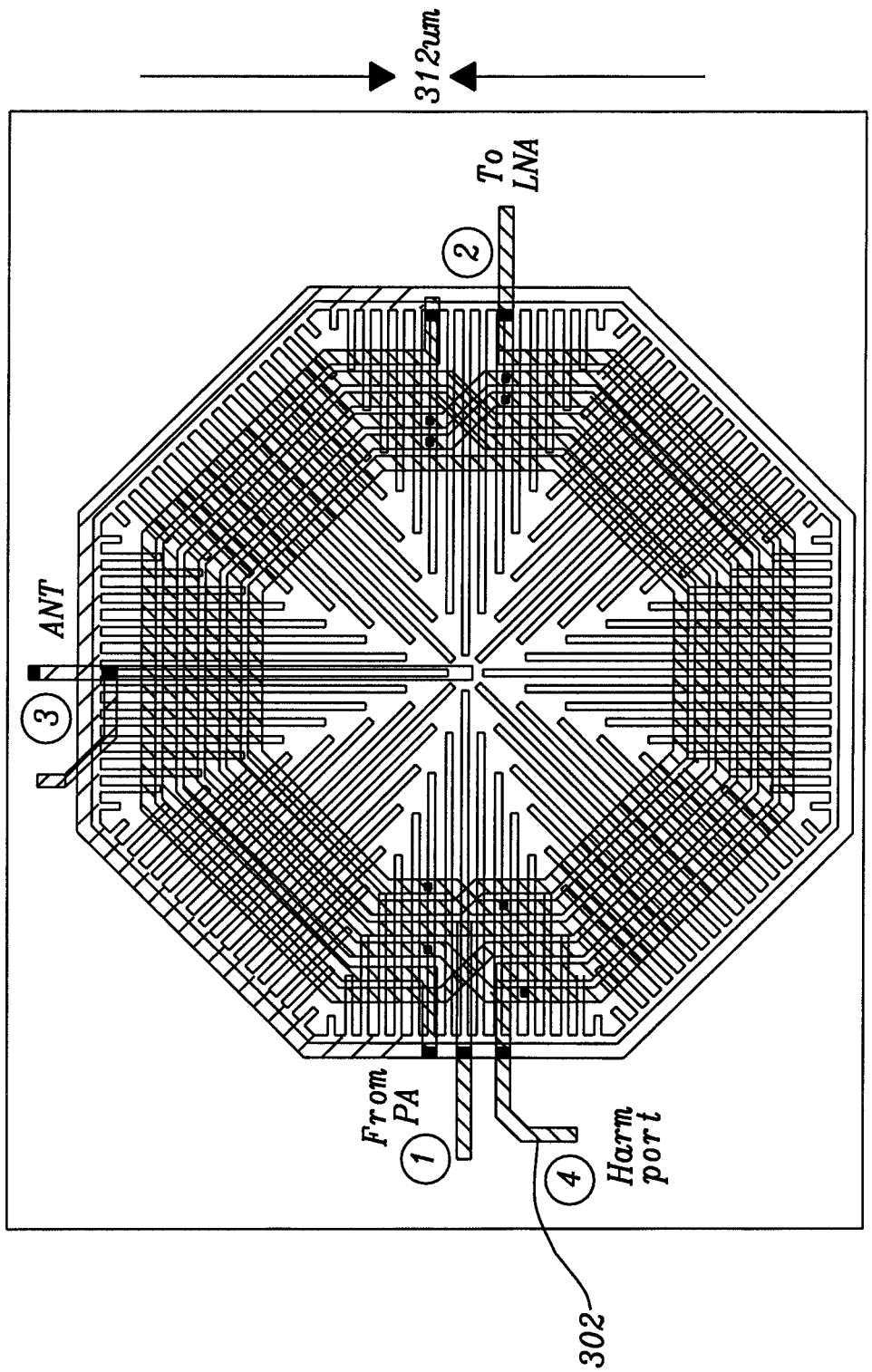
FIG. 5 is a plan view of an on-chip implementation of a composite inductor structure of the RFIO of FIG. 4.

FIG. 5 shows a schematic of an on-chip implementation (layout) of the composite inductor structure 302 in a single composite structure. The composite inductor structure 302 is provided on the top surface of the chip.

Figure 6:
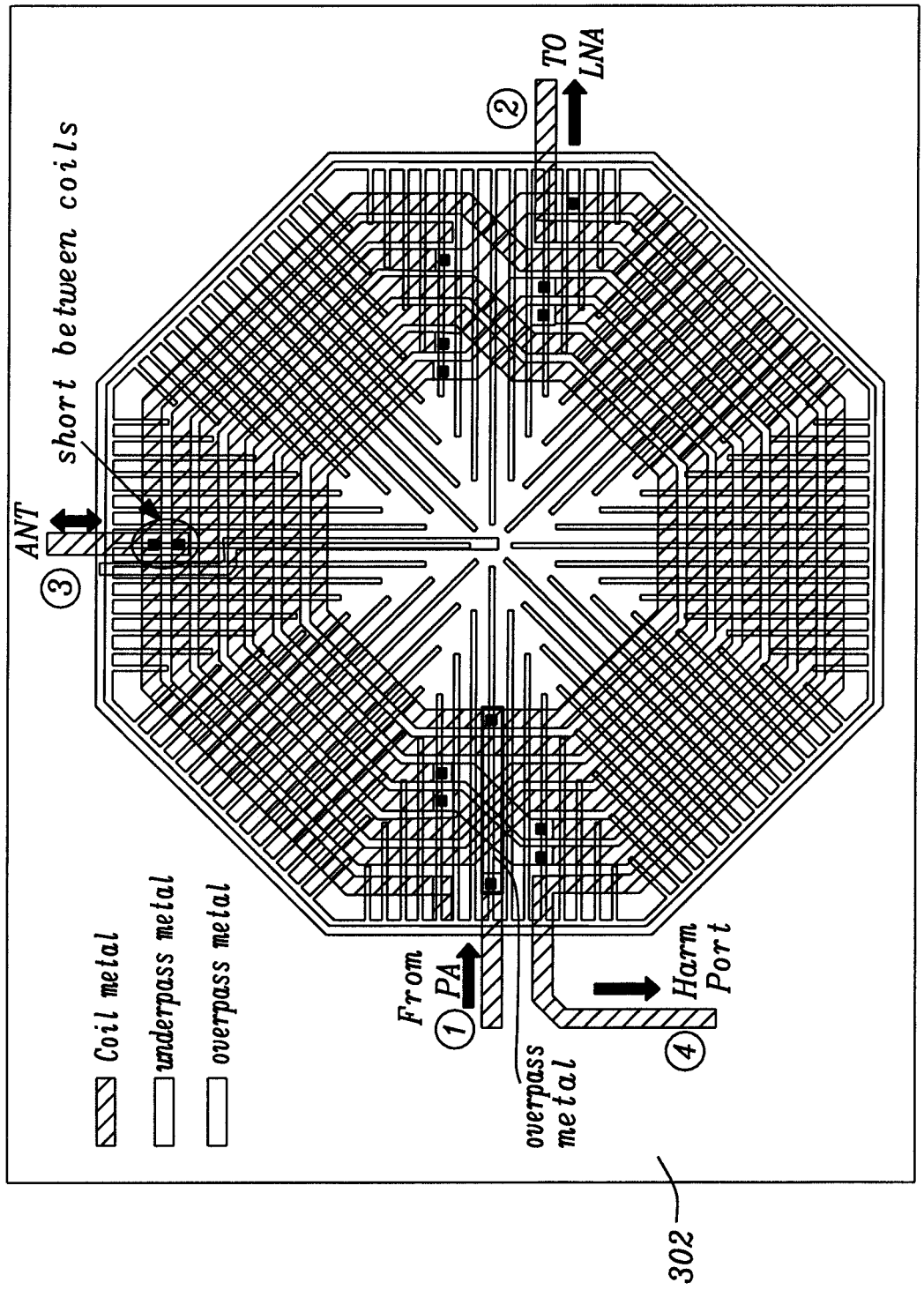
FIG. 6 is a plan view of another on-chip implementation of a composite inductor structure of the RFIO of FIG. 4.

FIG. 6 shows a schematic of an alternative on-chip implementation (layout) of the composite inductor structure 302 in a single composite structure. The composite inductor structure 302 is provided on the top surface of the chip.

The first inductor LD has a first terminal coupled to a first terminal of the Tx capacitor 322, which has a second terminal coupled to ground. A second terminal of the first inductor LD is coupled to a first terminal of the third inductor LS at a centre tap, such that the first inductor LD and the third inductor LS form a centre-tapped coil. The centre tap is coupled to a first terminal of the Rx switch 318. The Rx switch 318 has a second terminal coupled to ground. A second terminal of the third inductor LS is coupled to a first terminal of the harmonic capacitor 324. A second terminal of the harmonic capacitor 324 is coupled to a first terminal of the harmonic switch 334 which has a second terminal coupled to ground.

The first terminal of the first inductor LD is coupled to the antenna 104 and a first terminal of the second inductor LG. A second terminal of the second inductor LG is coupled to a first terminal of the Rx capacitor 320, which has a second terminal coupled to ground. The second terminal of the second inductor LG is also coupled to a first terminal of the Tx switch 316 which has a second terminal coupled to ground.

An input terminal 306 of the RFIO 300 is coupled to an output of the PA 110 via a first capacitor 126. In the Tx mode, the PA 110 receives an RF input signal RF-IN via a second capacitor 128 and outputs a PA output signal PA-OUT that is received at the input terminal 306 via the first capacitor 126. The input terminal 306 is coupled to the centre tap.

An output terminal 308 of the RFIO 300 is coupled to an input of the LNA 112 via a third capacitor 130. In the Rx mode, the LNA 112 receives a LNA input signal LNA-IN from the output terminal 308 via the third capacitor 130. The LNA 112 is coupled to a mixer 138. The output terminal 308 is coupled to the second terminal of the second inductor LG.

The RFIO 300 may be single-ended in that it comprises a signal port, as provided by the input terminal 306 or the antenna; and a ground port. The PA 110 and the LNA 112 may be single-ended amplifiers, such that the RFIO 300 is coupled to a single-ended output of the PA 110 and a single-ended input of the LNA 112. The PA 110 may be an inverter based Class D amplifier that provides a rectangular output while driven by a full swing rectangular pulse, where the full swing rectangular pulse varies from zero volts to a supply voltage. The LNA 112 may be a typical inverter-amplifier that receives a signal from the antenna 104, which may be a modulated carrier signal.

In the Tx mode, the PA 110 receives an RF input signal RF-IN via a second capacitor 128 and outputs a PA output signal PA-OUT that is received at the input terminal 306 via the first capacitor 126. The RFIO 300 interfaces (routes) the PA output signal PA-OUT to the antenna 104, and the antenna 104 transmits an antenna output signal AN-OUT that is derived from the PA output signal PA-OUT.

In the Rx mode, the antenna 104 receives an antenna input signal AN-IN. The RFIO 300 routes the antenna input signal AN-IN to the LNA 112. The LNA 112 receives a LNA input signal LNA-IN from the output terminal 308 via the third capacitor 130. The LNA input signal LNA-IN is derived from the antenna input signal AN-IN. The LNA 112 provides a LNA output signal, that is derived from the LNA input signal LNA-IN, to the mixer 138.

The antenna input signal AN-IN and the PA output signal PA-OUT may each have a fundamental frequency f0 with higher order harmonics, where the higher order harmonics have a frequency of nf0, where n is greater than or equal to 2 (for example 2f0, 3f0, . . . ).

The first inductor LD is for output matching. In the embodiment presented, there is provided PA output matching to the antenna 104 at the fundamental frequency f0, which ensures optimum power transmission at maximum efficiency through the RFIO 300 in the Tx mode.

The second inductor LG is for input matching. In the embodiment presented, there is provided LNA input matching to the antenna 104 at the fundamental frequency f0, which maximises a gain and minimises a noise figure (NF) in the Rx mode. LNA input matching typically uses an impedance of 50-ohm for a typical operating frequency with the fundamental frequency f0.

The third inductor LS, in series with the harmonic capacitor 324 is for filtering out one or more higher order harmonics of the fundamental frequency f0. Filtering out higher order harmonics is necessary to meet an FCC out-of-band spectral emission requirement.

Figure 7:
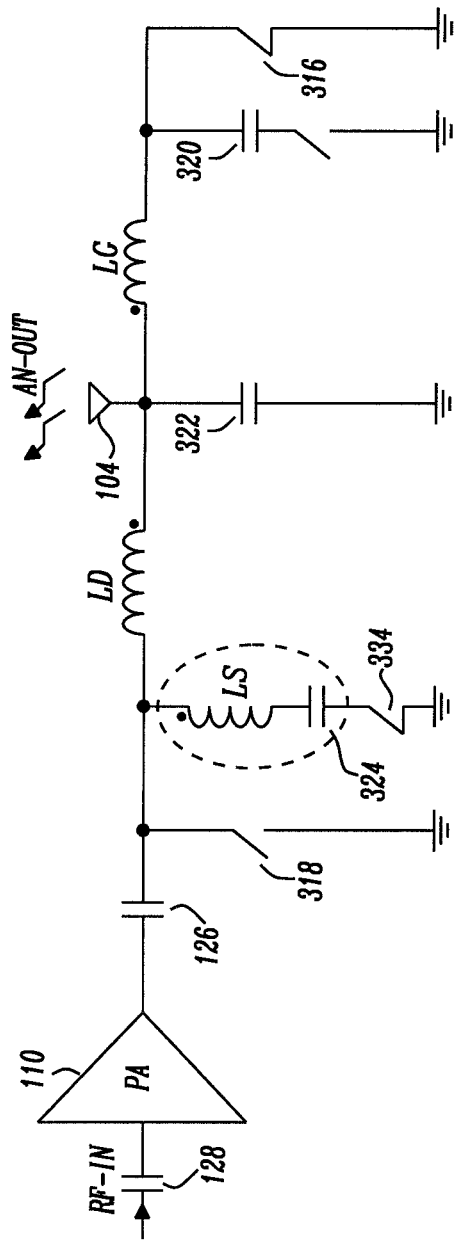
FIG. 7 is a schematic diagram of the operating portion of the RFIO of FIG. 4 in Tx mode.
Figure 8:
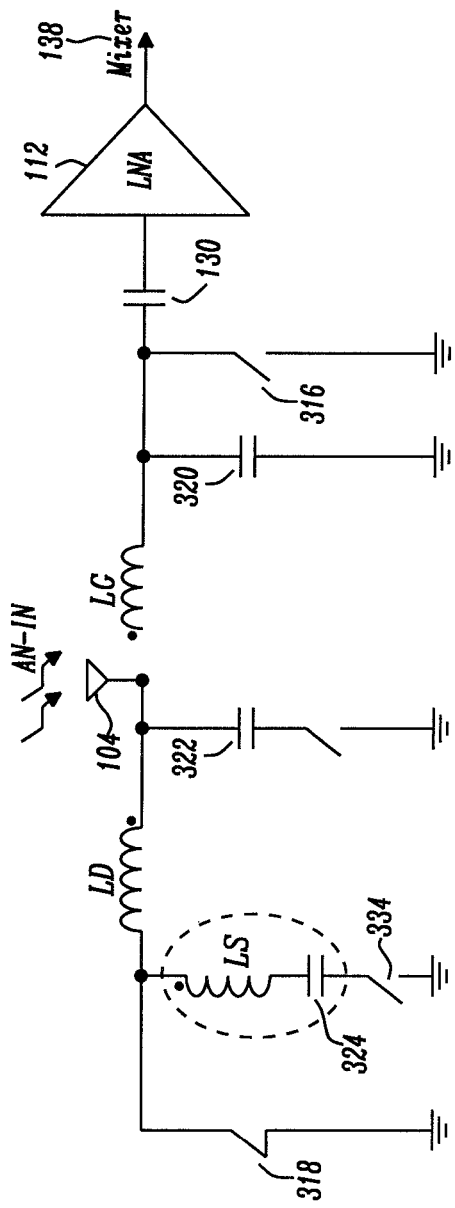
FIG. 8 is a schematic diagram of the operating portion of the RFIO of FIG. 4 in Rx mode.

FIG. 7 shows the functional operation of the RFIO 300 and the PA 110 in the Tx mode and FIG. 8 shows the functional operation of the RFIO 300 and the LNA 112 in the Rx mode.

In the Tx mode, the Tx switch 316 and the harmonic switch 334 are closed (ON), while the Rx switch 318 is open (OFF). Consequently, the input of the LNA 112 is grounded and the LNA 112 is not functional in the Tx mode.

In the Rx mode, the Rx switch 318 is closed (ON), while the Tx switch 316 and the harmonic switch 334 are open (OFF). Consequently, the output of the PA 110 is grounded and the PA 110 is not functional in the Rx mode.

Figure 9:
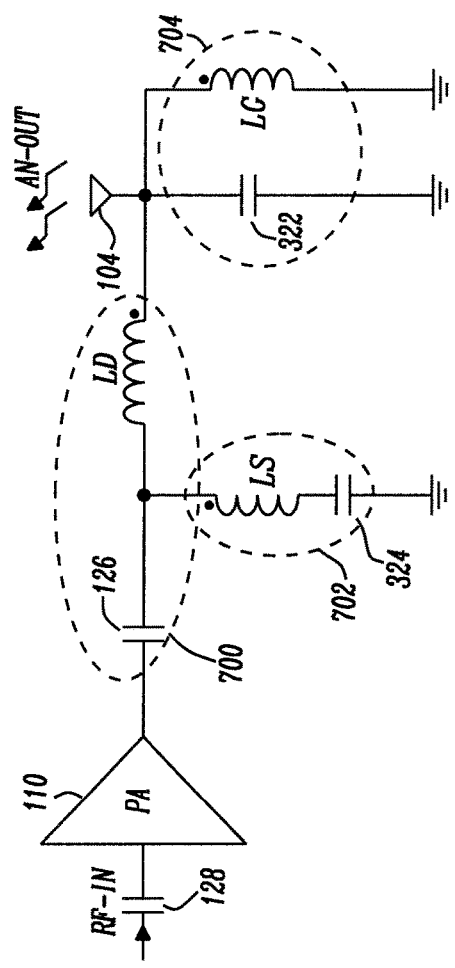
FIG. 9 is a schematic diagram of a functional equivalent circuit of the circuit of FIG. 4 in Tx mode.
Figure 10:
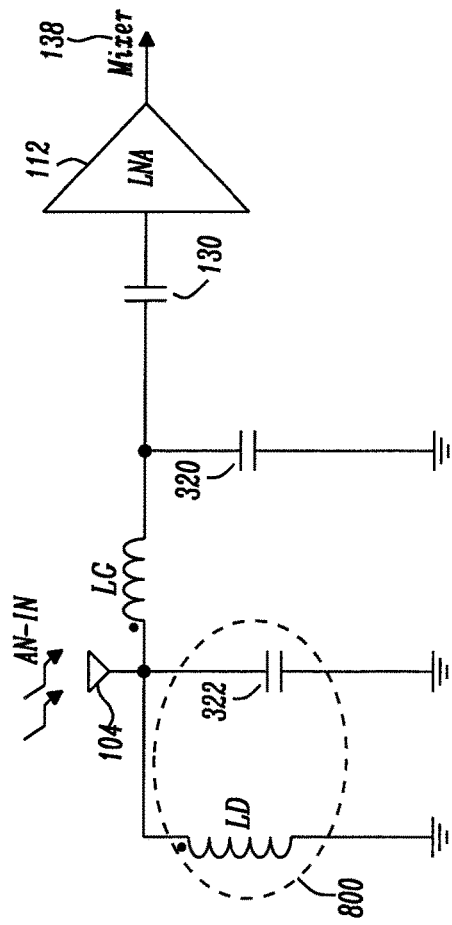
FIG. 10 is a schematic diagram of a functional equivalent circuit of the circuit of FIG. 4 in Rx mode.

FIG. 9 shows a functional equivalent circuit of the RFIO 300 with the PA 110 in the Tx mode and FIG. 10 shows a functional equivalent circuit of the RFIO 300 with the LNA 112 in the Rx mode.

The functional equivalent circuit of the RFIO 300 with the PA 110 in the Tx mode comprises a first series LC resonator 700, a second series LC resonator 702 and a first parallel LC resonator 704. The first series LC resonator 700, the second series LC resonator 702 and the first parallel LC resonator 704 provide PA output matching and filtering at the fundamental frequency f0. The first series LC resonator 700 may provide a minimum resistance at the fundamental frequency f0; the second series LC resonator 702 may provide a minimum resistance at the third harmonic frequency 3f0; and the first parallel LC resonator 704 may provide a maximum resistance at the fundamental frequency f0.

In the present embodiment, the first series LC resonator 700 comprises the first inductor LD and the first capacitor 126 coupled in series. The first series LC resonator 700 provides a minimum resistance at the fundamental frequency f0 and filters out undesired higher order harmonics (2f0, 3f0, 4f0 . . . ) in delivering the PA output signal PA-OUT to the antenna 104 at the fundamental frequency f0.

The second series LC resonator 702 comprises the third inductor LS and the harmonic capacitor 324 coupled in series. The second series LC resonator 702 provides a minimum resistance at the third harmonic frequency 3f0, which reduces the undesired third harmonic frequency 3f0 of the PA output signal PA-OUT.

The first parallel LC resonator 704 comprises the second inductor LG and the Tx capacitor 322 coupled in parallel. The first parallel LC resonator 704 provides a maximum resistance at the fundamental frequency f0, which holds the fundamental frequency f0 of the PA output signal PA-OUT at the antenna 104.

The first series LC resonator 700 and the first parallel LC resonator 704 provide PA output matching at the fundamental frequency f0 which enables power transmission of the PA output signal PA-OUT to the antenna 104 at optimum efficiency.

The first series LC resonator 700 filters out the higher order harmonics (2f0, 3f0, 4f0, . . . ) of the PA output signal PA-OUT and delivers the antenna output signal AN-OUT to the antenna 104. The antenna output signal AN-OUT comprises the fundamental frequency f0 (corresponding to a sinusoidal wave) of the PA output signal PA-OUT.

The PA output signal PA-OUT may be a rectangular wave. Typically, the rectangular wave comprises odd harmonics (f0, 3f0, 5f0, . . . ) and the third harmonic frequency 3f0 is dominant after the fundamental frequency f0. The second series LC resonator 702 is resonant at a third harmonic frequency 3f0 and filters out, or attenuates, the third harmonic frequency 3f0. The first parallel LC resonator 704 provides a maximum resistance and holds the antenna output signal AN-OUT for transmission from the antenna 104.

A $3^{rd}$ harmonic attenuator, comprising the third inductor LS, the second inductor LG and the Tx capacitor 322 is formed in the Tx mode. The $3^{rd}$ harmonic attenuator may be used to filter out the third harmonic frequency 3f0, which is the dominant undesired signal.

The functional equivalent circuit of the RFIO 300 with the LNA 112 in Rx mode comprises a second parallel LC resonator 800 comprising the first inductor LD and the Tx capacitor 322. The second parallel LC resonator 800 provides a maximum resistance to hold the antenna input signal AN-IN, which is received at the antenna 104. The functional equivalent circuit of the RFIO 300 with the LNA 112 in Rx mode further comprises a pi matching network at the input of the LNA 112, comprising the second inductor LG, the first inductor LD, the Rx capacitor 320 and the Tx capacitor 322. The pi matching network provides LNA input matching in the Rx mode, which provides a maximum gain and a minimum noise figure.

The composite inductor structure 302 may be implemented as a low-area composite coil structure of multiple inductors on a chip. The composite inductor structure 302 can achieve multiple functionalities in an RFIO corresponding to input matching, output matching and filtering. Prior art RFIOs use multiple isolated inductors to achieve matching and filtering. The isolated inductors are bulky and require a large chip area for their implementation. The composite inductor structure 302 is a low area structure, and therefore has an advantage over isolated inductors for RFIOs; the composite inductor structure 302 can enable a very low chip area RFIO for wireless transceivers which may be used for Bluetooth, Zigbee and WLAN standards.

Each of the three inductors LD, LG, LS has an effective inductance and a self inductance. The effective inductances of each of the three inductors LD, LG, LS are enhanced due to magnetic coupling between the three inductors LD, LG, LS. As the three inductors LD, LG, LS are interwound, and are arranged such that the direction of current is the same in the three inductors LD, LG, LS, the effective inductance of each of the three inductors LD, LG, LS is a summation of their self-inductance and a mutual inductance. The effective inductance of an inductor $L_{eff}$ is given by:

$$L_{eff}=L_{self}+M=L_1+K\sqrt{L_1 L_2}$$

where $L_{self}$ is the self inductance of the inductor, M is the mutual inductance, $L_1$ is the self inductance of a first inductor, $L_2$ is the self inductance of a second inductor and K is a coupling factor, where K<1. In the above equation $L_{self}=L_1$.

Therefore, the three inductors may have a small size, and may achieve effective inductances greater than the inductances of the isolated inductors of the prior art, that are of a comparable size.

If the three inductors LD, LG, LS are in close proximity to each other and share the same core, there may be a slight degradation in a quality (Q) factor of the three inductors LD, LG, LS. The degraded Q factor may result in an increased attenuation of power in Tx mode and an increased NF in Rx mode. Therefore, to avoid degradation of the Q factor it may be necessary to have a slightly larger spacing between the three inductors LD, LG, LS when compared to the spacing used in a conventional transformer.

However, the composite inductor structure 302 has a smaller on-chip footprint than an implementation of isolated inductors, and therefore results in lower magnetic losses, relating to coupling to other nearby on-chip circuits and systems, and lower capacitive (electrical) losses, relating to capacitive coupling to the substrate due to a low area. The lower losses result in improved Q factors for the three inductors LD, LG, LS. Therefore, the smaller on-chip footprint of the composite inductor structure 302 compensates for the degradation of the Q factor due to the close proximity of the three inductors LD, LG, LS sharing the same core.

The composite inductor structure 302 comprises interconnects between the three inductors LD, LG, LS. The size of the interconnects is reduced significantly when compared to an implementation using isolated inductors. This further reduces the losses, by reducing resistive losses, the amount of on-chip routing required and the on-chip routing complexity. The low chip area and compact design of the composite inductor structure 302 can enable low cost wireless transceivers.

Figure 11:
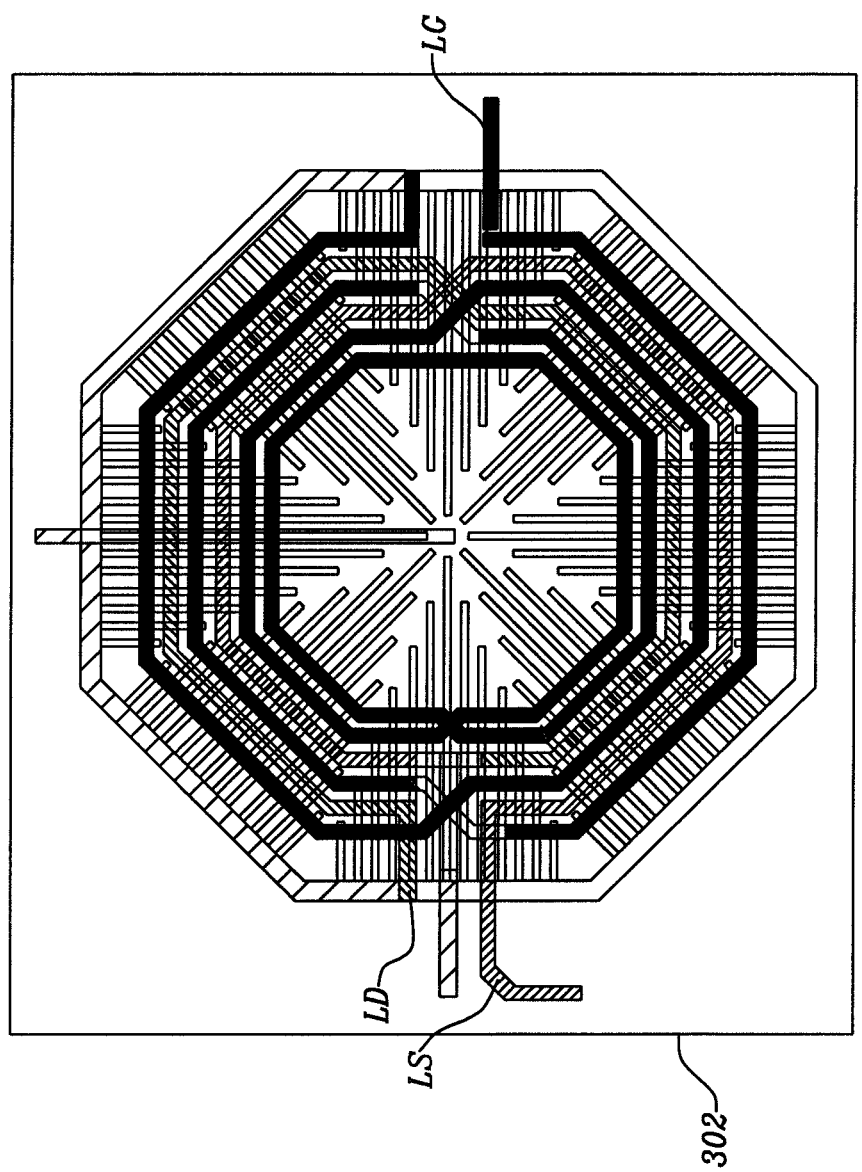
FIG. 11 is another plan view of the on-chip implementation of the composite inductor structure of the RFIO of FIG. 4.

The composite inductor structure 302 may be implemented as a single coil structure of multiple inductors in a single plane on a chip. FIG. 11 shows a schematic of an on-chip implementation of the composite inductor structure 302 with the three inductors LD, LG, LS on a single metal layer, with a further metal layer for short overpass/underpass. The schematic of the on-chip implementation shown in FIG. 11 corresponds to the schematic of the on-chip implementation shown in FIG. 5.

Figure 12:
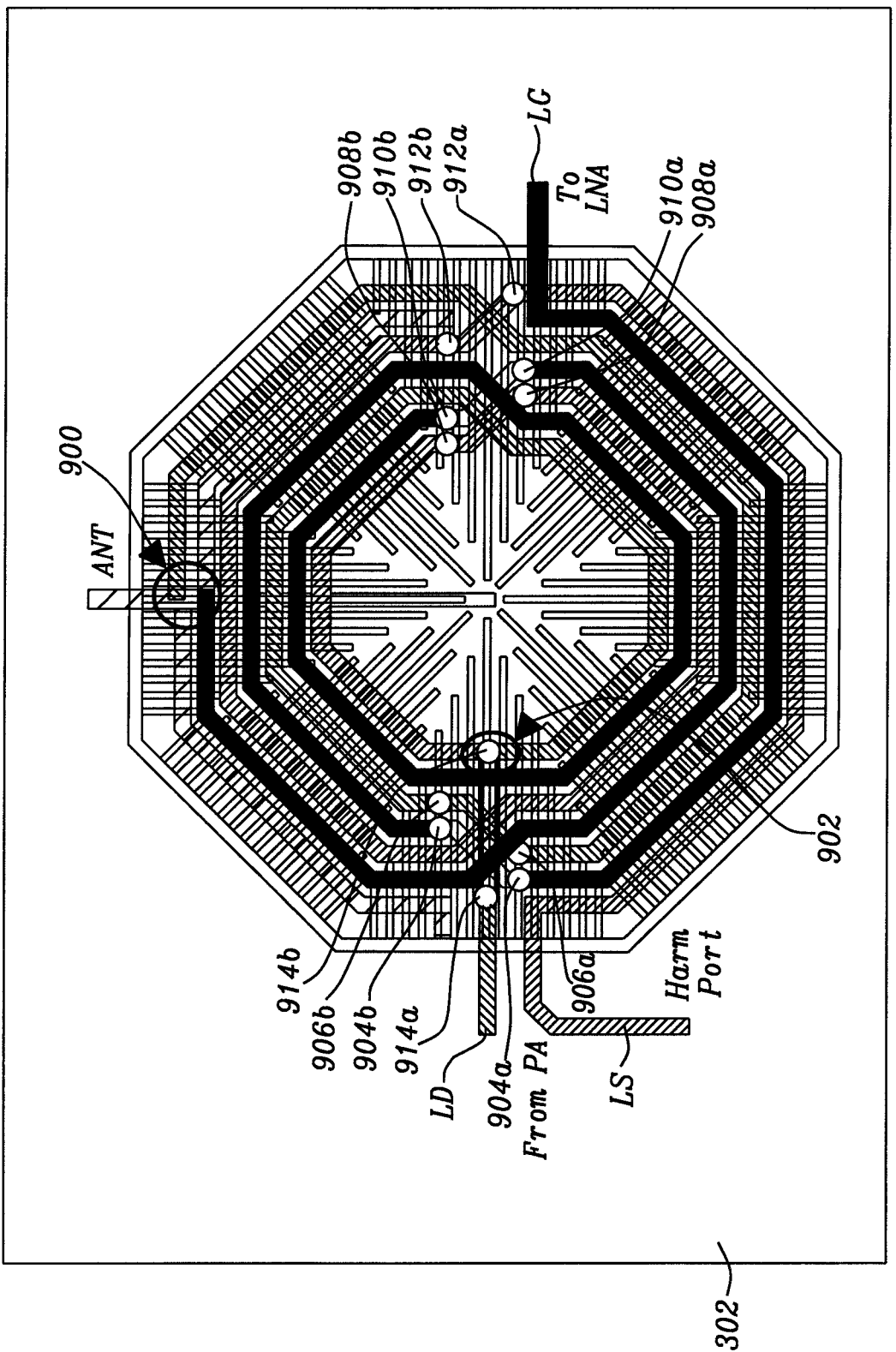
FIG. 12 is another plan view of the other on-chip implementation of the composite inductor structure of the RFIO of FIG. 4.

FIG. 12 shows a schematic of an alternative on-chip implementation of the composite inductor structure 302 with the three inductors LD, LG, LS on a single metal layer. The schematic of the alternative on-chip implementation shown in FIG. 12 corresponds to the schematic of the on-chip implementation shown in FIG. 6.

There is a short 900 between the first inductor LD and the second inductor LG. There is a join 902 between the first inductor LD and the third inductor LS.

Different metal layers are used to provide underpasses and overpasses. An underpass corresponds to a metal layer below the single metal layer that is used to enable a portion of an inductor to pass underneath another inductor. An overpass corresponds to a metal layer above the single metal layer that is used to enable a portion of an inductor to pass above another inductor.

There is provided a plurality of underpasses as follows: a first underpass from 904a to 904b; a second underpass from 906a to 906b, a third underpass from 908a to 908b, a fourth underpass from 910a to 910b and a fifth underpass from 912a to 912b. There is provided an overpass from 914a to 914b.

Alternatively, the composite inductor structure 302 may be implemented as a single coil structure of multiple inductors in multiple planes by using multiple metal layers on the chip. Using multiple metal layers on the chip results in an increased effective inductance for each of the three inductors LD, LG, LS of the composite inductor structure 302 due to magnetic coupling. Additionally, the Q factor may be increased by overlaying metal layers on multiple levels.

Figure 13:
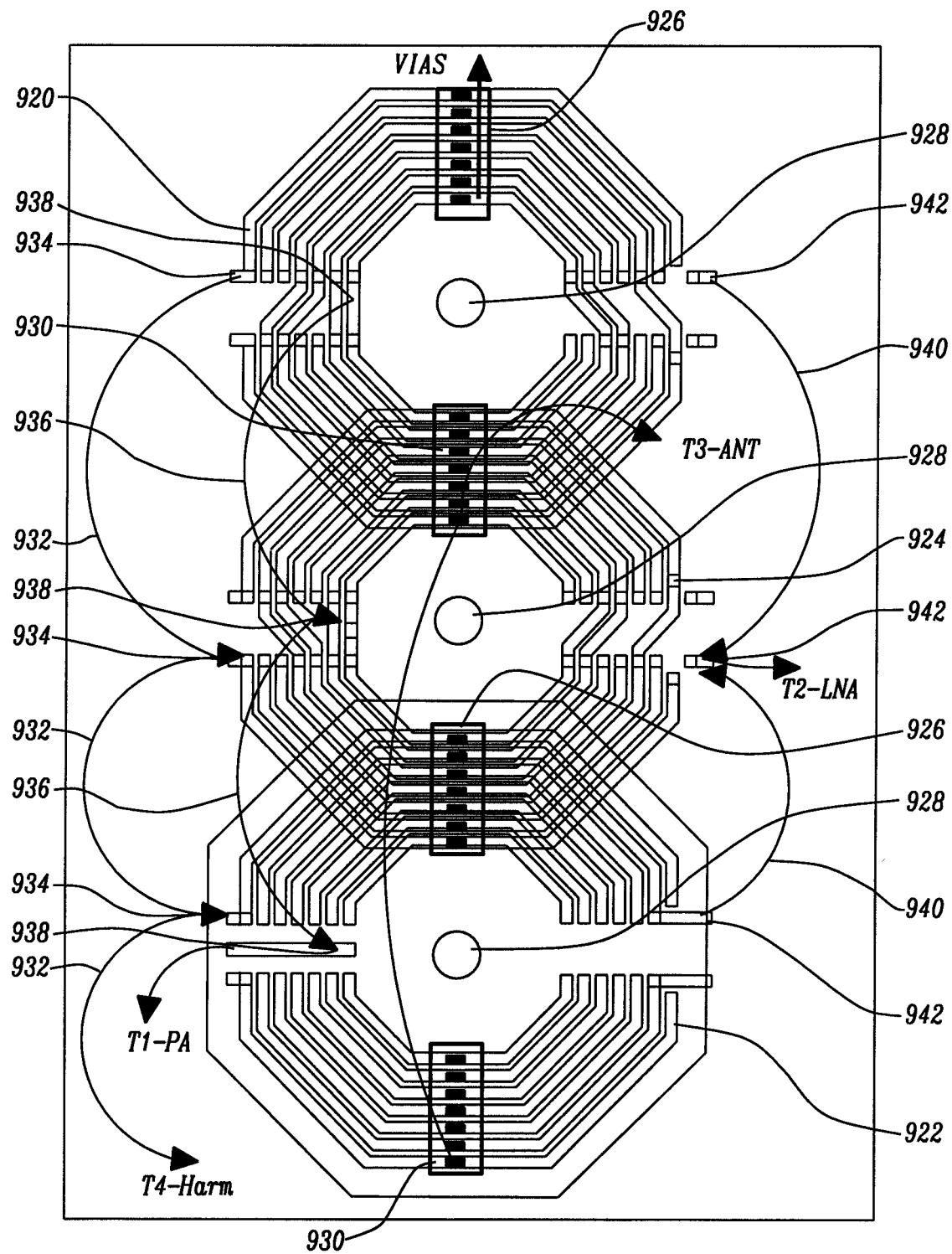
FIG. 13 is a plan, view of an on-chip implementation of the composite inductor structure of the RFIO of FIG. 4 implemented in multiple metal layers.

FIG. 13 shows a schematic of an alternative on-chip implementation of the composite inductor structure 302 with the three inductors LD, LG, LS implemented across three metal layers. Therefore, the three inductors LD, LG, LS are at different depths of the chip. The different metal layers are connected using a plurality of vias. There is provided a top metal layer 920 comprising a top winding, a middle metal layer 922 comprising a middle winding and a bottom metal layer 924 comprising a bottom winding. The three metal layers 920, 922, 924 are connected by a first series of vias 926 and a second series of vias 930.

A top down view of each of the metal layers is shown in FIG. 13, with each metal layer offset with respect to the other metal layers. This is to aid in clarity of the drawing and it will be appreciated that in the physical implementation, the bottom metal layer 924 will be positioned below the middle metal layer 922, which will be positioned below the top metal layer 920. Additionally, in the physical implementation, the windings will be around a common axis 928.

There is a first connection 932 between a first set of terminals 934; a second connection 936 between a second set of terminals 938; and a third connection 940 between a third set of terminals 942.

Alternatively, each metal layer may comprise one or more of the three inductors LD, LG, LS.

Figure 14:
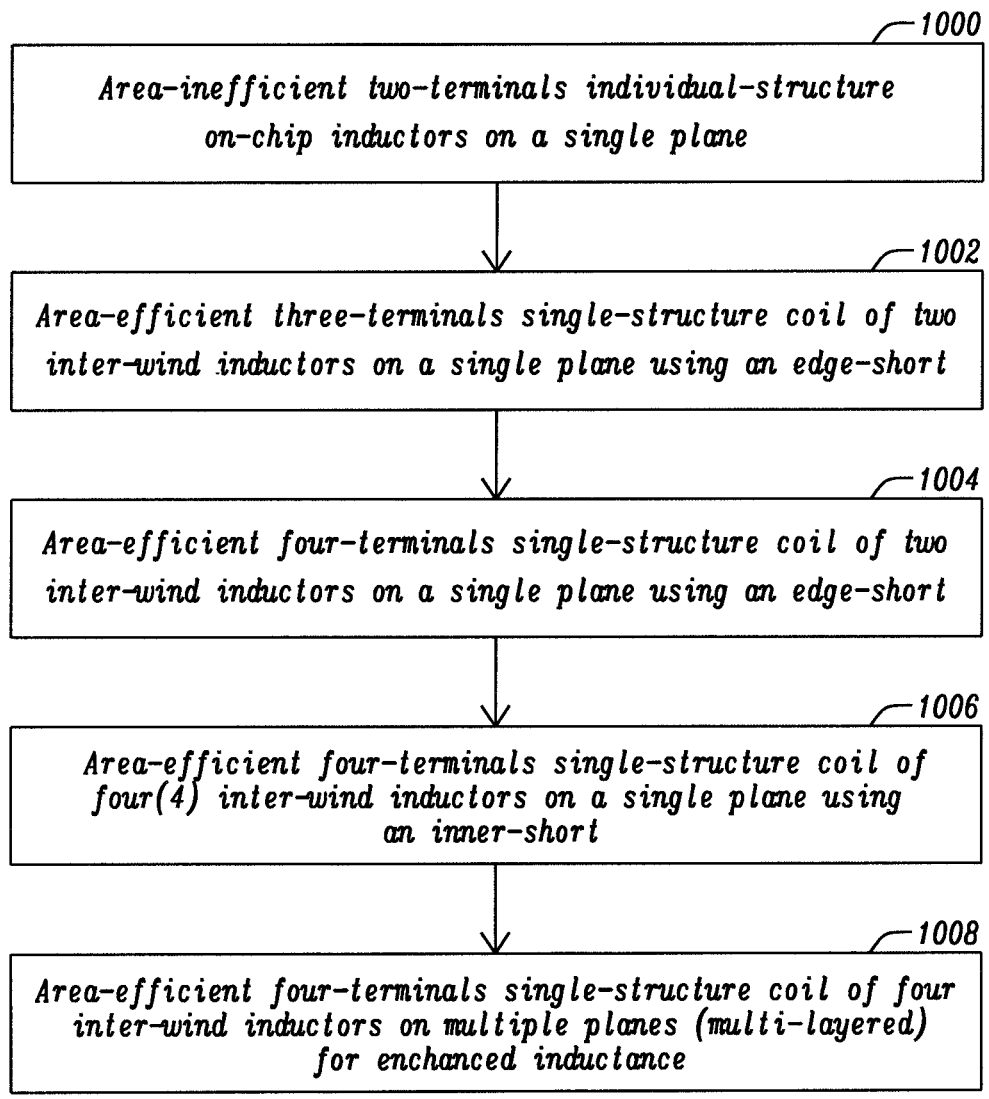
FIG. 14 is a design flow illustrating how the composite inductor structure was designed.
Figure 15:
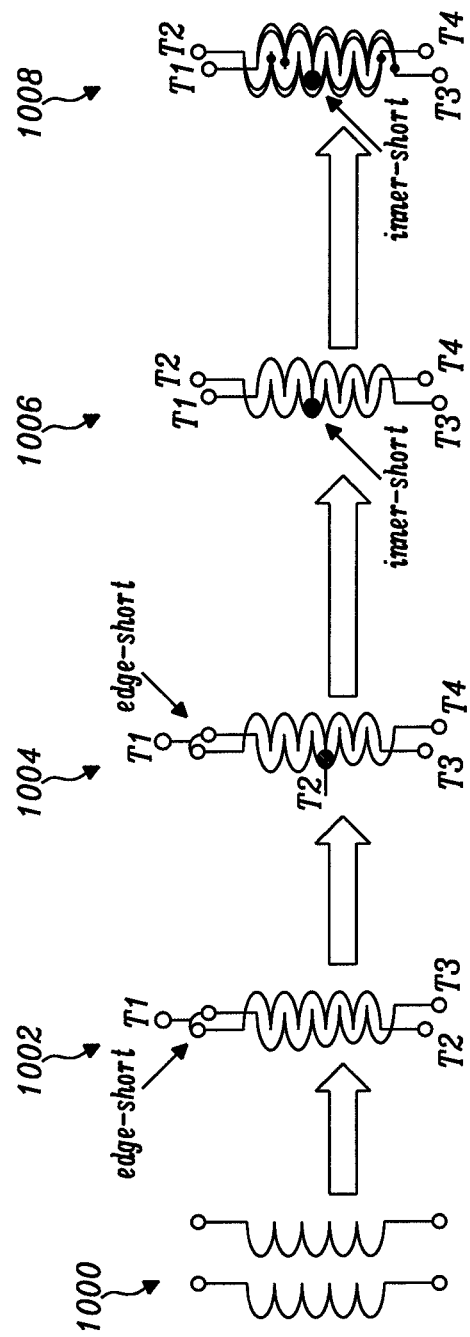
FIG. 15 is a physical implementation flow illustrating a physical arrangement of the composite inductor structure at each stage of the flow.

A design flow, illustrating how the composite inductor structure 302 was designed is shown in FIG. 14. FIG. 15 shows a physical implementation flow, illustrating a physical arrangement at each stage of the flow and relating to each stage of the design flow.

At a first step 1000 there is provided an area-inefficient structure comprising two isolated inductors, where each of the isolated inductors comprises two terminals. The isolated inductors are implemented on a single plane.

At a second step 1002 there is provided a first area efficient structure with three terminals, comprising two interwound inductors on a single plane, where the inductors are shorted at an edge (an edge short).

At a third step 1004 there is provided a second area efficient structure with four terminals, comprising two interwound inductors on a single plane, where the inductors are shorted at an edge (an edge short) and a port is provided on one of the inductors.

At a fourth step 1006 there is provided a third area efficient structure with four terminals, comprising four interwound inductors on a single plane, where there is an inner short between the inductors.

At a fifth step 1008 there is provided a fourth area efficient structure with four terminals, comprising four interwound inductors on multiple planes (multiple metal layers on the chip). The effective inductances of the inductors are enhanced due to magnetic coupling compared with the other area efficient structures.

The physical arrangement of the interwound inductors and inclusion of an electrical short (the edge-short or the inner-short) between the inductors provides the structures as shown in FIG. 15 for RFIO for radio transceivers.

Figure 16:
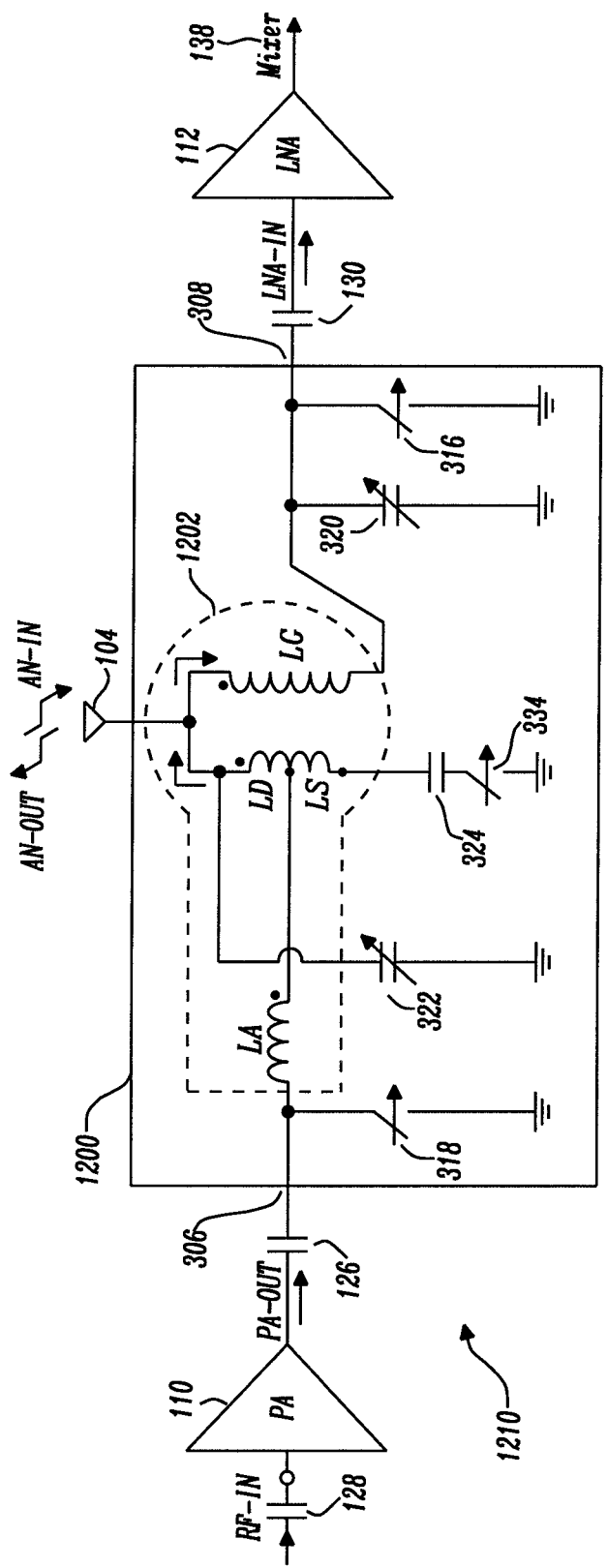
FIG. 16 is a schematic diagram of an RFIO in accordance with a second embodiment of this disclosure.

FIG. 16 shows an RFIO 1200 for a radio transceiver in accordance with a second embodiment of this disclosure.

The RFIO 1200 may, for example, be implemented in a BLE or Zigbee radio. The RFIO 1200 comprises a composite inductor structure 1202. The RFIO 1200 is the same as the RFIO 300 of FIG. 4 with the addition of an additional inductor LA which has a first terminal coupled to the centre tap and a second terminal coupled to the first terminal of the Rx switch 318.

The RFIO 1200 is implemented in a radio front-end 1210. The radio front-end 1210 shares some common features with the radio front end 114 of FIG. 1 and the radio front-end 310 of FIG. 4, as represented by common reference numerals. It will be appreciated that the RFIO 1200 may be implemented in other ways and is not limited to the radio front-end 1210 implementation shown in FIG. 16.

The composite inductor structure 1202 comprises a first inductor LD, a second inductor LG, a third inductor LS and the additional inductor LA. The additional inductor LA is an isolated inductor and is embedded inside the central area enclosed by the first, second and third inductors LD, LG, LS. The central area may comprise a core, in which case the additional inductor LA will be embedded inside the core of the first, second and third inductors LD, LG, LS. The first, second, and third inductors LD, LG, LS are magnetically coupled together and are interwound, which together with the additional inductor LA, forms the composite inductor structure 1202. The composite inductor structure 1202 occupies almost the same area of the RFIO 1200, as the composite inductor structure 302.

Figure 17:
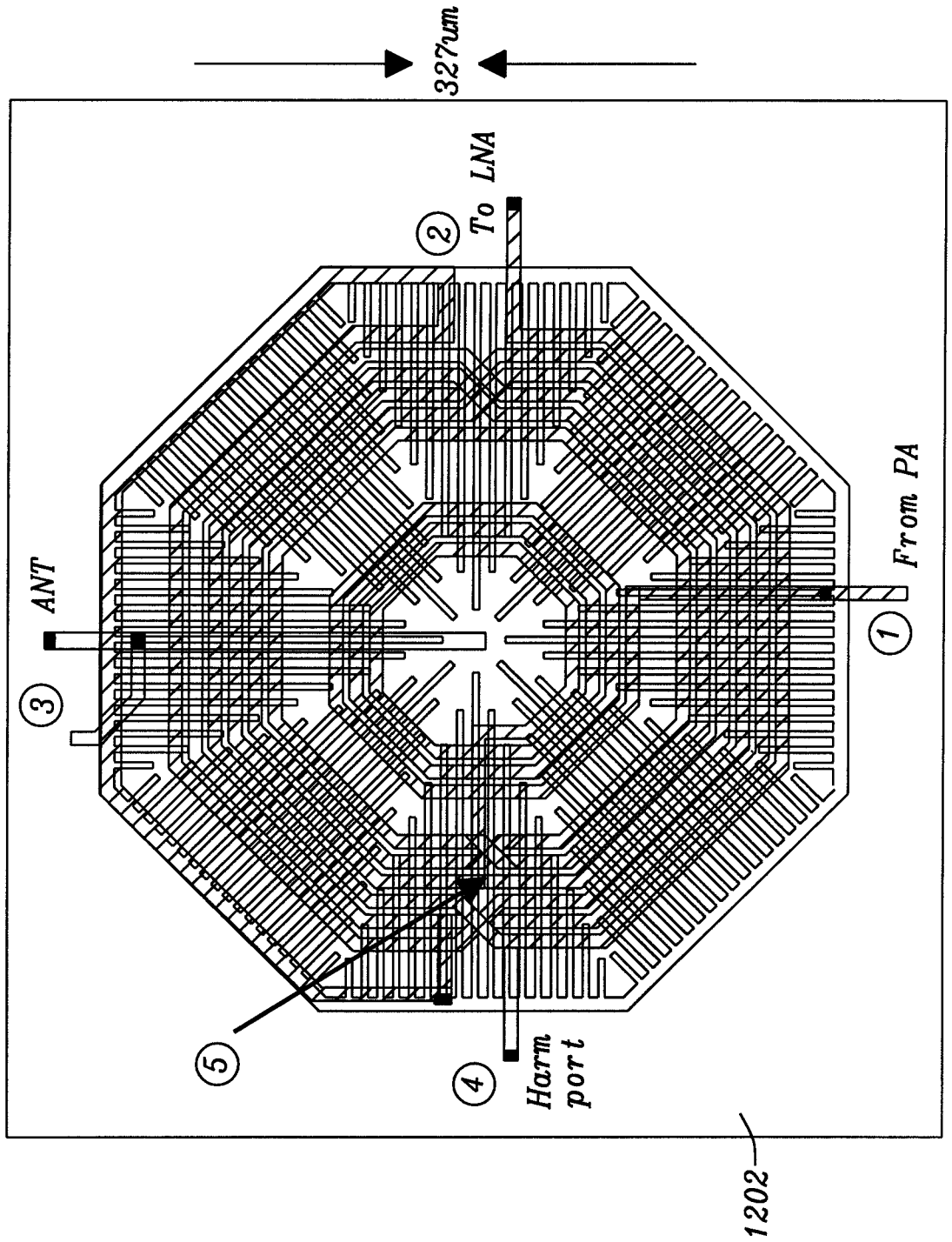
FIG. 17 is a plan view of an on-chip implementation of a composite inductor structure of the RFIO of FIG. 16.
Figure 18:
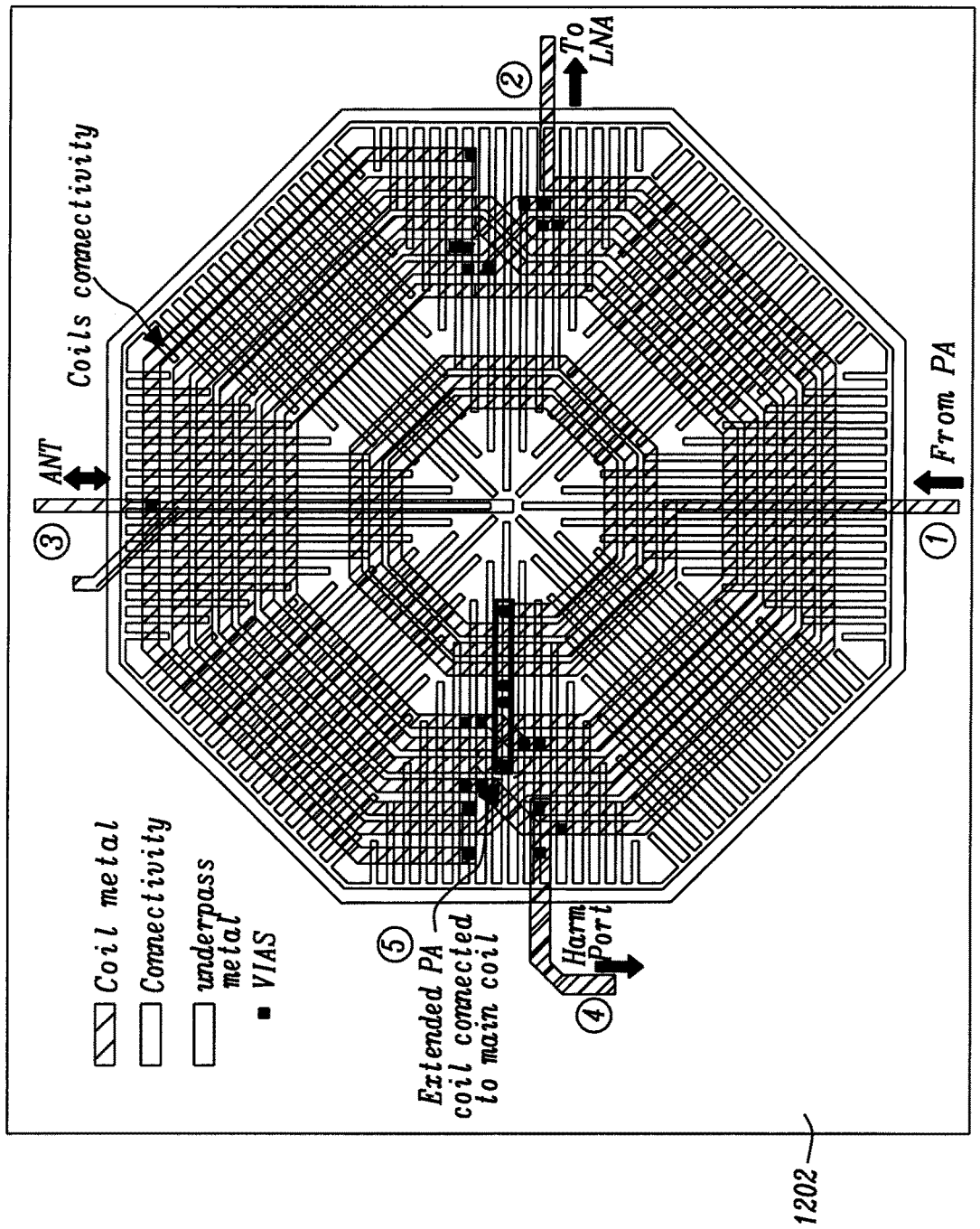
FIG. 18 is another plan view of the on-chip implementation of a composite inductor structure of the RFIO of FIG. 16.

FIG. 17 and FIG. 18 show schematics of an on-chip implementation (layout) of the composite inductor structure 1202 in a single composite structure. The composite inductor structure 1202 is provided on the top surface of the chip.

Figure 19:
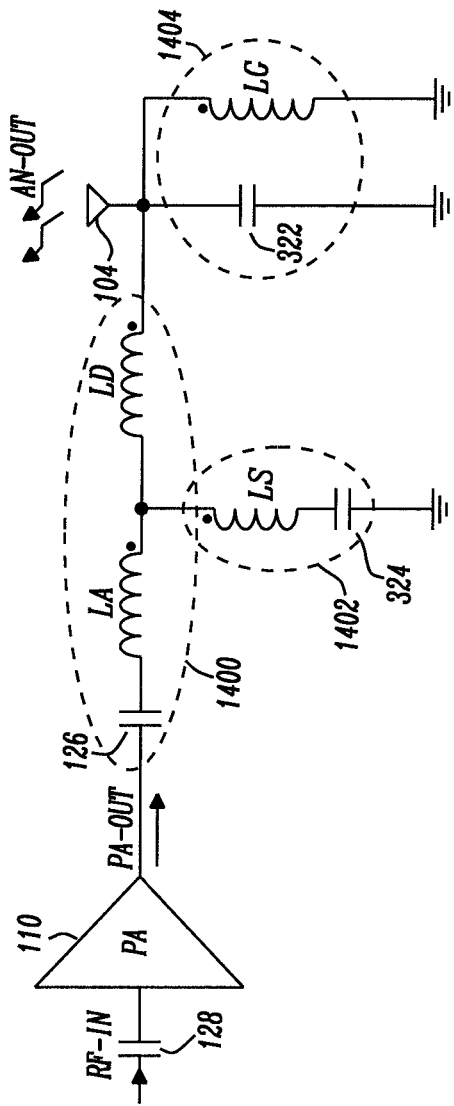
FIG. 19 is a schematic diagram of the operating portion of the RFIO of FIG. 16 in Tx mode.
Figure 20:
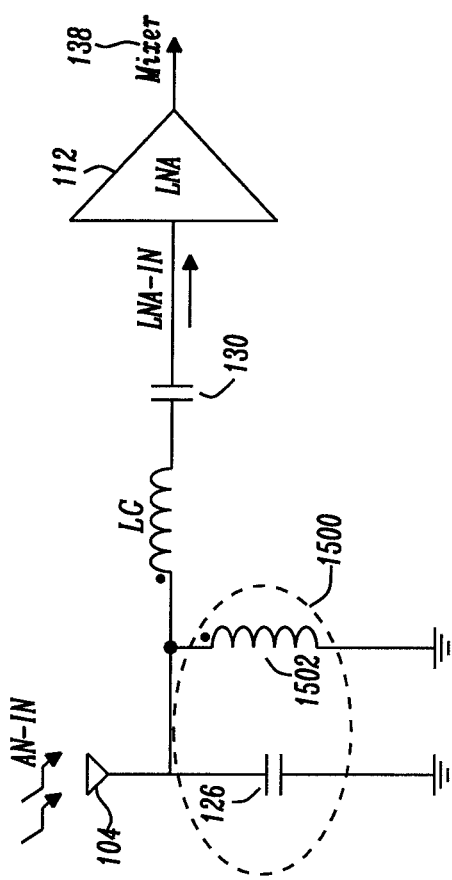
FIG. 20 is a schematic diagram of the operating portion of the RFIO of FIG. 16 in Rx mode.

FIG. 19 shows the functional operation of the RFIO 1200 and the PA 110 in the Tx mode and FIG. 20 shows the functional operation of the RFIO 1200 and the LNA 112 in the Rx mode.

The functional equivalent circuit of the RFIO 1200 with the PA 110 in the Tx mode comprises a first series LC resonator 1400, a second series LC resonator 1402 and a first parallel LC resonator 1404. The first series LC resonator 1400 comprises the first inductor LD, the additional inductor LA and the first capacitor 126 coupled in series.

The second series LC resonator 1402 comprises the third inductor LS and the harmonic capacitor 324 coupled in series. The first parallel LC resonator 1404 comprises the second inductor LG and the Tx capacitor 322 coupled in parallel.

The functional equivalent circuit of the RFIO 1200 with the LNA 112 in Rx mode comprises a second parallel LC resonator 1500 comprising the first inductor LD, the additional inductor LA and the first capacitor 126. The first inductor LD and the additional inductor LA are coupled in series to form a series pair 1502. The series pair 1502 is coupled in parallel with the first capacitor 126. Alternatively, the first inductor LD and the additional inductor LA may be coupled in series with the first capacitor 126 to form a series resonator.

The operation of the RFIO 1200 in Tx mode and Rx mode is the same as described previously for the RFIO 300, however in the Tx mode, the additional inductor LA is added with the first inductor LD at the output of the PA 110. As the additional inductor LA is embedded inside the central area it has a low Q factor compared to the first, second and third inductors LD, LG and LS. However, the additional inductor LA offers an advantage in that the combined inductance of the additional inductor LA and the first inductor LD, compared with the first inductor LD on its own, results in an increased efficiency of the PA 110. The location of a third harmonic trap that is resonant at the third harmonic frequency 3f0 does not affect the PA output matching at the fundamental frequency f0.

The proposed RFIOs 300, 1200 may be designed and implemented in low power CMOS technology. The performance of the RFIOs 300, 1200 are evaluated by evaluating the performance of the core RF circuits (the LNA 112 and the PA 110) in Tx and Rx modes. The LNA 112 performance may be evaluated by considering gain, noise figure (NF) and input matching in the Rx mode. The PA 110 performance may be evaluated by considering output power (transmitted) and output matching in the Tx mode.

The composite inductor structures 302, 1202, along with connectivity and interconnects are modelled using a simulator. Circuit simulators are used to evaluate the Tx mode and the Rx mode performance of the LNA 112 and the PA 110 for the proposed RFIOs 300, 1200.

Figure 21B:
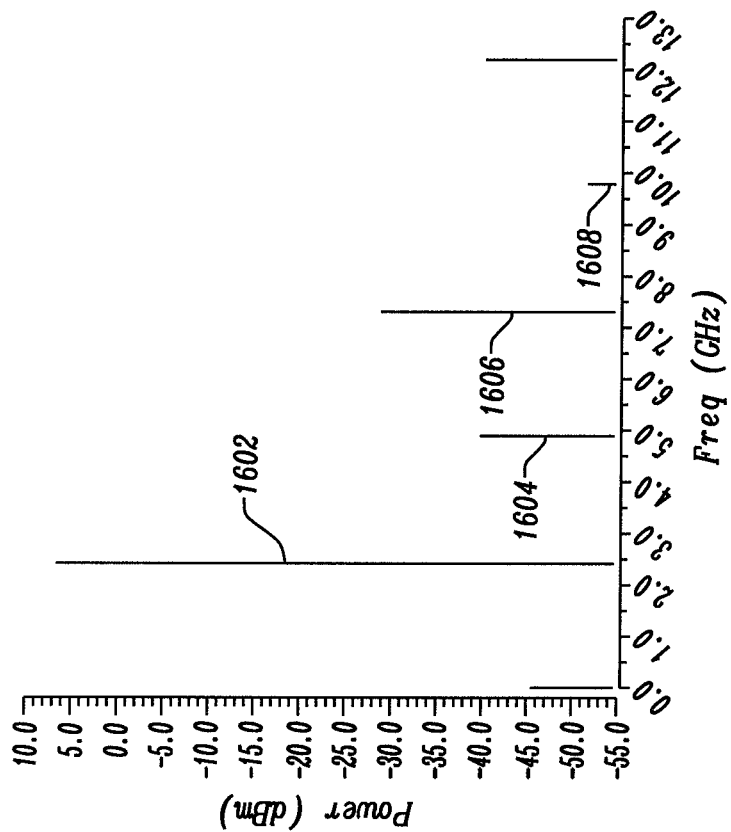
FIGS. 21a and 21b are graphs relating to output matching of a power amplifier (PA) in Tx mode.
Figure 21A:
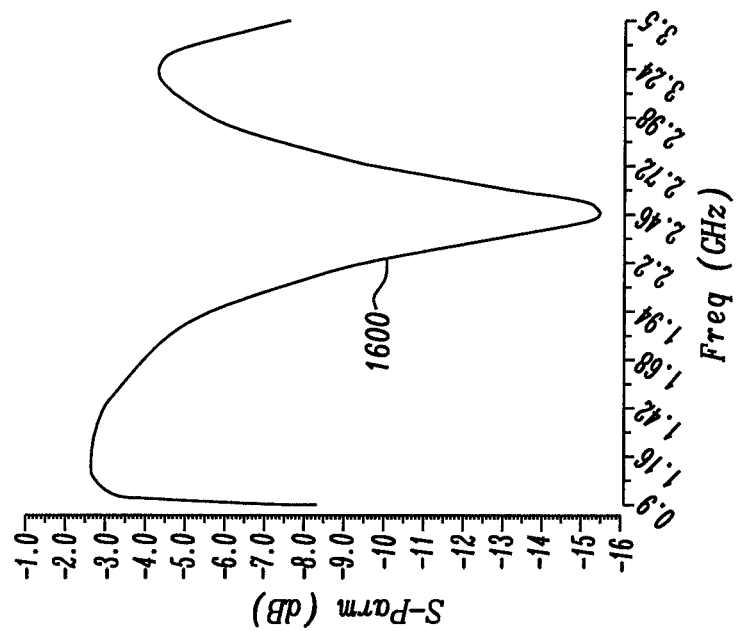

FIGS. 21a and 21b show traces relating to output matching of the PA 110 in Tx mode. The traces are: an output return loss S22 1600 in FIG. 21a, an output power of the PA at the fundamental frequency f0 1602 in FIG. 21b and at the harmonic frequencies: 2f0 1604, 3f0 1606 and 4f0 1608. The output return loss S22 is substantially below −10 dB over a desired bandwidth (2.4-2.5 GHz) which indicates a good PA output matching.

Figure 22:
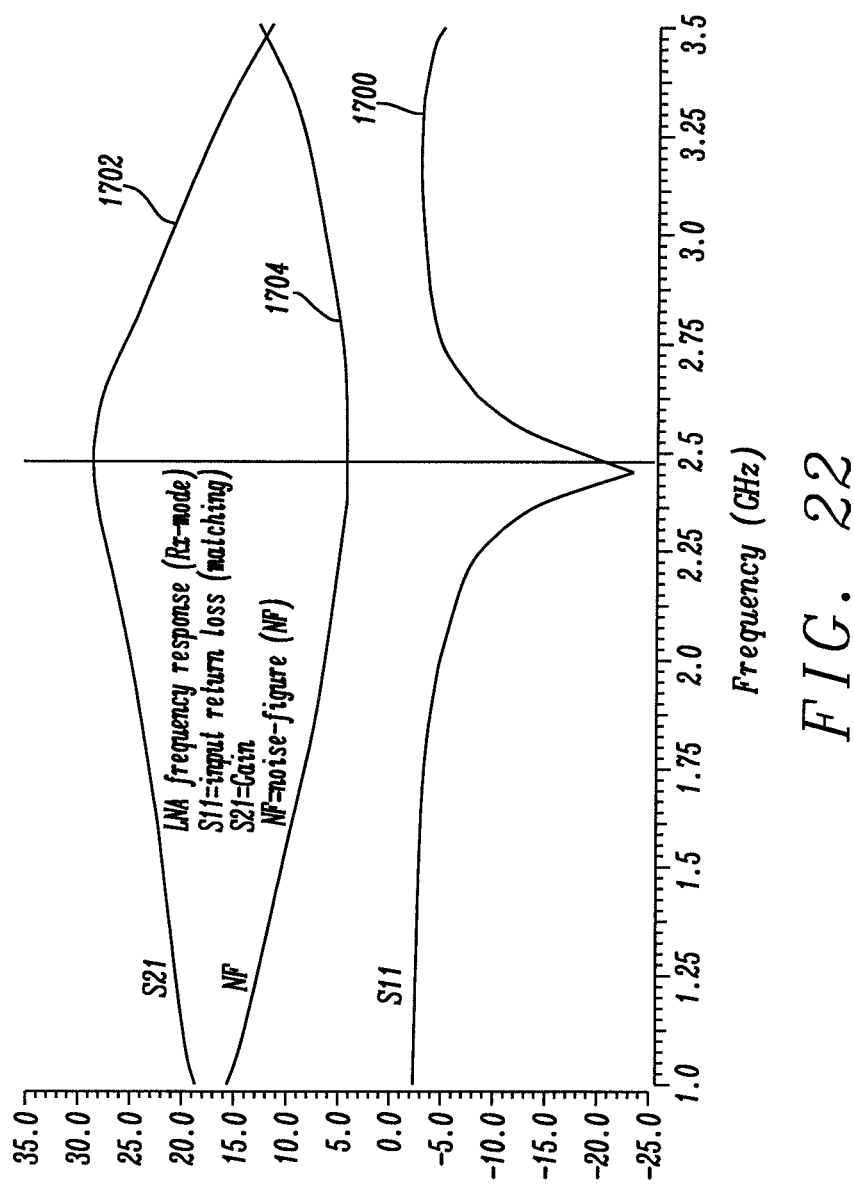
FIG. 22 is a graph relating to frequency response of a low noise amplifier (LNA) in Rx mode.

FIG. 22 shows LNA frequency responses for an input return loss S11 1700, a gain S21 1702 and a noise figure NF 1704 in the Rx mode. It can be observed that there is a good input matching of the LNA 112 as S11 1700 is substantially below −10 dB over the desired bandwidth (2.4-2.5 GHz).

Various improvements and modifications may be made to the above without departing from the scope of the disclosure.

What is claimed is:

1. A radio frequency input/output circuit comprising a composite inductor structure, the composite inductor structure comprising a plurality of inductors comprising:
   an output matching inductor;
   an input matching inductor; and
   a harmonic filter inductor; wherein:
   the plurality of inductors are intertwined and wound around the same point or axis;
     the output matching inductor and the harmonic filter inductor are coupled at a centre tap, such that the output matching inductor and the harmonic filter inductor form a centre-tapped coil;
     the centre tap is coupled to an input terminal;
     the output matching inductor and the input matching inductor are coupled to an antenna; and:
     the radio frequency input/output circuit is operable in a transmit mode in which an input signal received at the input terminal is routed to the antenna to be transmitted by the antenna as an antenna output signal.

2. The radio frequency input/output circuit of claim 1 wherein the composite inductor structure is implemented on a chip.

3. The radio frequency input/output circuit of claim 2, wherein one or more of the inductors of the composite inductor structure are at least one of different depths of the chip and spanning different depths of the chip.

4. The radio frequency input/output circuit of claim 1, wherein the plurality of inductors are magnetically coupled.

5. The radio frequency input/output circuit of claim 1, wherein the input matching inductor is coupled in series with the output matching inductor and the output matching inductor is coupled in series with the harmonic filter inductor.

6. The radio frequency input/output circuit of claim 1, wherein the input terminal is coupled to a power amplifier and the input terminal receives the input signal from the power amplifier.

7. The radio frequency input/output circuit of claim 1, wherein the second input matching inductor is coupled to an output terminal.

8. The radio frequency input/output circuit of claim 7, wherein the radio frequency input/output circuit is operable in a receive mode in which an antenna input signal received at the antenna is routed to the output terminal.

9. The radio frequency input/output circuit of claim 8, wherein the output terminal is coupled to a low noise amplifier and the low noise amplifier receives an output signal from the output terminal.

10. The radio frequency input/output circuit of claim 1, wherein the harmonic filter inductor is coupled to a harmonic capacitor.

11. The radio frequency input/output circuit of claim 1, wherein the composite inductor structure comprises an additional inductor.

12. The radio frequency input/output circuit of claim 11, wherein the input matching inductor is coupled in series with the output matching inductor and the output matching inductor is coupled in series with the harmonic filter inductor, wherein the additional now abandoned inductor is coupled to the centre tap.

13. The radio frequency input/output circuit of claim 12, wherein the additional inductor is coupled to the input terminal.

14. A method of providing a radio frequency input/output circuit comprising a composite inductor structure, the composite inductor structure comprising a plurality of inductors comprising:
an output matching inductor;
an input matching inductor; and
a harmonic filter inductor; wherein:
the plurality of inductors are intertwined and wound around the same point or axis;
the output matching inductor and the harmonic filter inductor are coupled at a centre tap, such that the output matching inductor and the harmonic filter inductor form a centre-tapped coil;
the centre tap is coupled to an input terminal;
the output matching inductor and the input matching inductor are coupled to an antenna; and:
the radio frequency input/output circuit is operable in a transmit mode in which an input signal received at the input terminal is routed to the antenna to be transmitted by the antenna as an antenna output signal.

15. The method of claim 14 wherein the composite inductor structure is implemented on a chip.

16. The method of claim 14, wherein the plurality of inductors are magnetically coupled.

17. The method of claim 14, wherein the input matching inductor is coupled in series with the output matching inductor and the output matching inductor is coupled in series with the harmonic filter inductor.

\* \* \* \* \*

UNITED STATES PATENT AND TRADEMARK OFFICE
CERTIFICATE OF CORRECTION

PATENT NO. : 10,848,196 B2  
APPLICATION NO. : 15/843440  
DATED : November 24, 2020  
INVENTOR(S) : Mahbub Reja et al.

Page 1 of 1

It is certified that error appears in the above-identified patent and that said Letters Patent is hereby corrected as shown below:

In the Claims

Column 13, Lines 8-10, should read:
7. The radio frequency input/output circuit of claim 1, wherein the input matching inductor is coupled to an output terminal.

Column 13, Lines 26-31, should read:
12. The radio frequency input/output circuit of claim 11, wherein the input matching inductor is coupled in series with the output matching inductor and the output matching inductor is coupled in series with the harmonic filter inductor, wherein the additional inductor is coupled to the centre tap.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*